(12) United States Patent
Porte et al.

(10) Patent No.: US 9,284,060 B2
(45) Date of Patent: Mar. 15, 2016

(54) AIRCRAFT NACELLE INCLUDING A REAR FRAME INCLINED TO THE REAR

(75) Inventors: Alain Porte, Colomiers (FR); Jacques Lalane, Saint Orens De Gameville (FR); Frederic Chelin, Encausse (FR)

(73) Assignee: AIRBUS OPERATIONS (S.A.S), Toulouse (FR)

( * ) Notice: Subject to any disclaimer, the term of this patent is extended or adjusted under 35 U.S.C. 154(b) by 1164 days.

(21) Appl. No.: 13/270,536

(22) Filed: Oct. 11, 2011

(65) Prior Publication Data

US 2012/0090694 A1     Apr. 19, 2012

(30) Foreign Application Priority Data

Oct. 15, 2010   (FR) ...................................... 10 58428

(51) Int. Cl.
*B64D 33/02*         (2006.01)
(52) U.S. Cl.
CPC ........ *B64D 33/02* (2013.01); *B64D 2033/0206* (2013.01); *B64D 2033/0286* (2013.01); *Y10T 137/0536* (2015.04)
(58) Field of Classification Search
CPC ........... B64D 33/02; B64D 2033/0286; B64D 2033/0206; Y10T 137/0536
USPC ................ 60/226.1, 796; 244/53 B; 137/15.1
See application file for complete search history.

(56) References Cited

U.S. PATENT DOCUMENTS

| | | | |
|---|---|---|---|
| 3,571,977 A | | 3/1971 | Abeel |
| 5,114,100 A | * | 5/1992 | Rudolph et al. .......... 244/134 C |
| 6,179,249 B1 | * | 1/2001 | Canadas ..................... 244/53 R |
| 6,920,958 B2 | * | 7/2005 | Harrison ....................... 181/214 |
| 7,434,303 B2 | * | 10/2008 | Maguire ....................... 29/426.5 |
| 2002/0148929 A1 | * | 10/2002 | Andre et al. .............. 244/134 R |
| 2005/0269443 A1 | * | 12/2005 | Porte ........................... 244/53 B |
| 2008/0016844 A1 | * | 1/2008 | Shutrump .................... 60/226.1 |
| 2009/0152401 A1 | * | 6/2009 | Sternberger ............. 244/134 B |
| 2009/0314899 A1 | | 12/2009 | Porte et al. |
| 2010/0084507 A1 | * | 4/2010 | Vauchel et al. ............... 244/1 N |

(Continued)

FOREIGN PATENT DOCUMENTS

| | | |
|---|---|---|
| EP | 0 436 243 A2 | 7/1991 |
| FR | 2 904 604 A1 | 2/2008 |

(Continued)

OTHER PUBLICATIONS

French Search Report, dated May 27, 2011, from corresponding French application.

*Primary Examiner* — Phutthiwat Wongwian
*Assistant Examiner* — Carlos A Rivera
(74) *Attorney, Agent, or Firm* — Young & Thompson

(57) ABSTRACT

An aircraft nacelle includes a lip whose surface contacts with the aerodynamic streams extends inside the nacelle by an inside wall that delimits a layer that empties at a power plant and outside of the nacelle by an outside wall, a first front frame connects the inside and outside walls, delimiting an annular pipe with the lip, and a rear frame connects the inside and outside walls at a junction zone between the inside pipe and power plant pipe, for a given cross-section of the nacelle along a plane that contains the longitudinal axis of the nacelle, a point A at the intersection between the rear frame and the inside wall, and a point B at the intersection between the rear frame and the outside wall, with B being offset toward the rear of the nacelle relative to A over more than 50% of the rear frame's periphery.

11 Claims, 4 Drawing Sheets

(56) References Cited

U.S. PATENT DOCUMENTS

2011/0167606 A1\* 7/2011 Shutrump ................. 29/428
2011/0197973 A1\* 8/2011 Binks et al. ............... 137/15.1

FOREIGN PATENT DOCUMENTS

| GB | 1 197 711 A | 7/1970 |
| GB | 2 273 131 A | 6/1994 |

\* cited by examiner

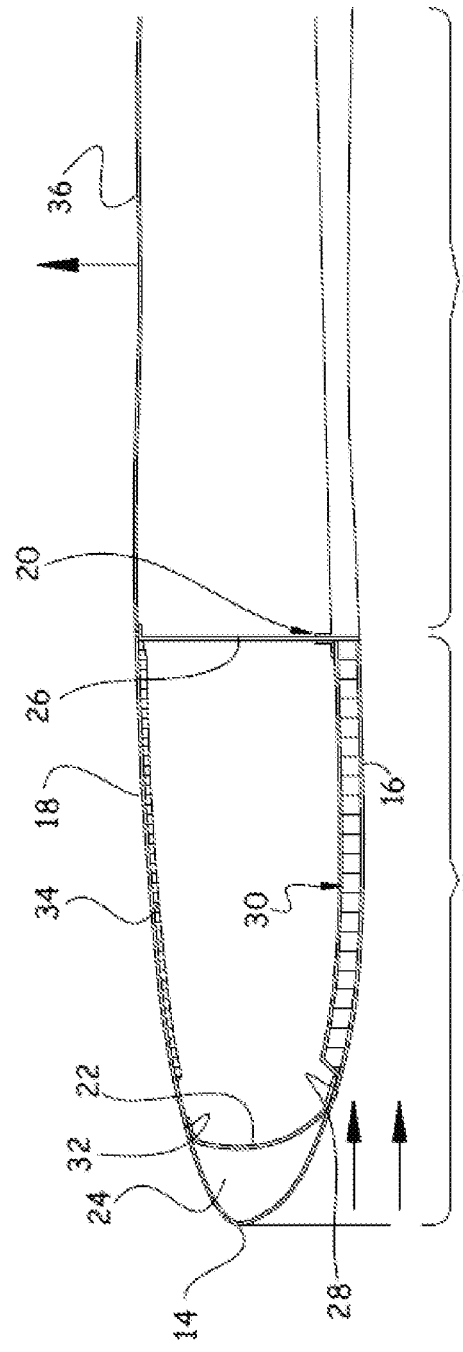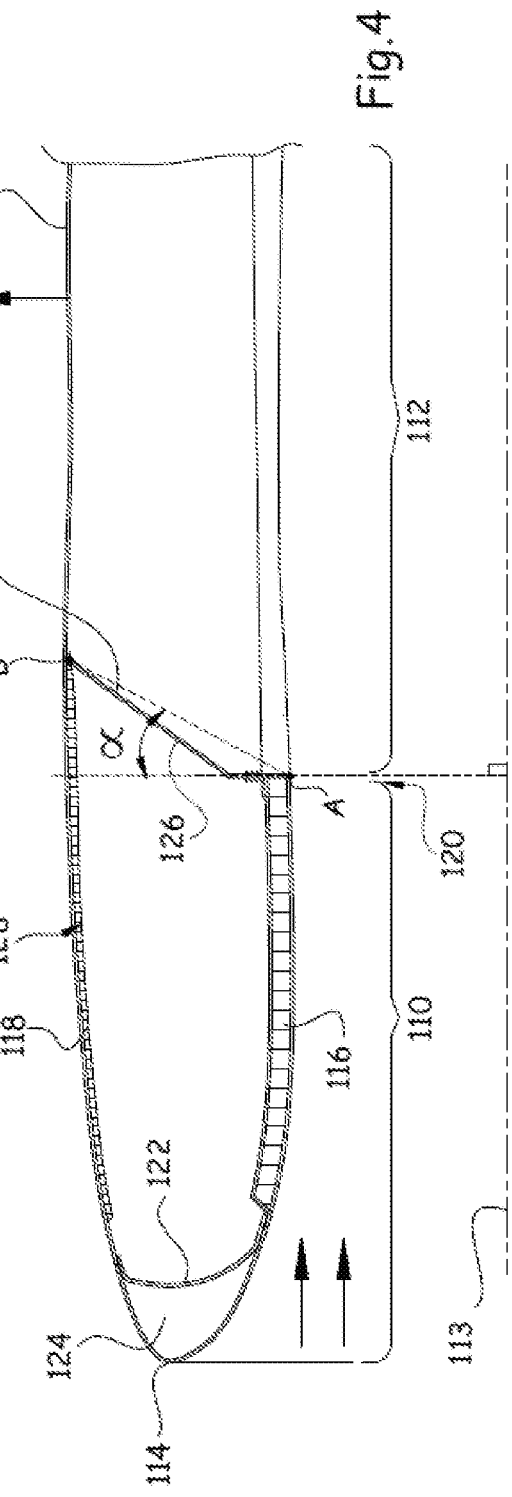

AIRCRAFT NACELLE INCLUDING A REAR FRAME INCLINED TO THE REAR

BACKGROUND OF THE INVENTION

1. Field of the Invention

This invention relates to an aircraft nacelle that incorporates a frame that is tilted toward the rear.

2. Description of the Related Art

An aircraft propulsion system comprises a nacelle in which a power plant is arranged in an essentially concentric manner.

Figure 1:
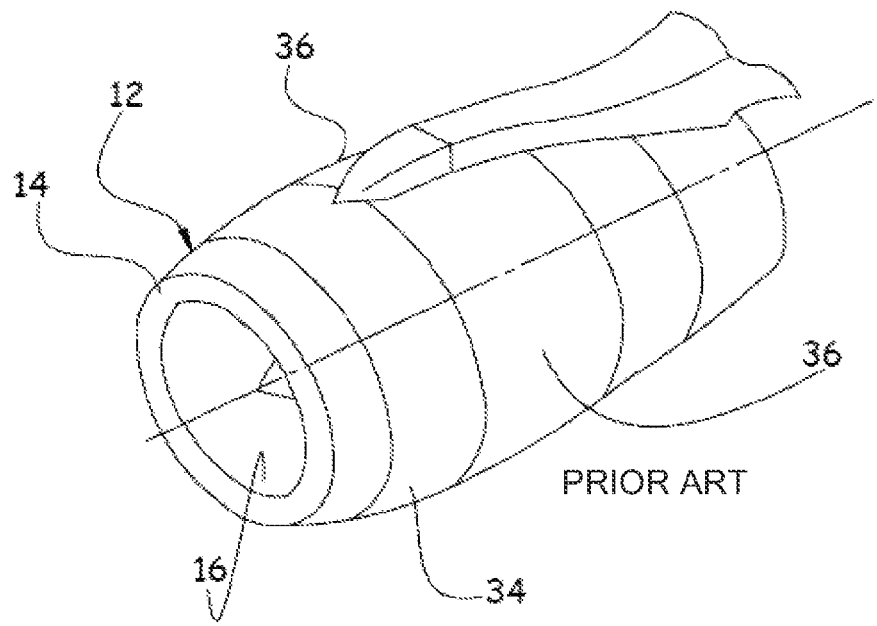

As illustrated in FIGS. 1 and 2, the nacelle comprises an air intake 10 at the front that makes it possible to channel a stream of air in the direction of the power plant 12, with a first part of the incoming air stream, called the primary stream, passing through the power plant to take part in the combustion process, and with the second part of the air stream, called the secondary stream, being entrained by a fan and flowing into an annular pipe that is delimited by the inside wall of the nacelle and the outside wall of the power plant.

The air intake 10 comprises a lip 14 of which the surface that is in contact with the aerodynamic streams is extended inside the nacelle by an inside wall 16 that delimits a pipe and outside of the nacelle by an outside wall 18.

The air intake 10 is connected to the power plant 12 at a junction zone 20 by any suitable means. The junction zone 20 is essentially flat and perpendicular to the longitudinal axis of the nacelle.

On the structural plane, the air intake 10 comprises a first frame called a front frame 22 that connects the inside wall 16 and the outside wall 18 that delimits an annular pipe 24 with the lip 14 and a second frame called a rear frame 26 that connects the inside wall 16 and the outside wall 18 close to the junction surface 20 of the power plant.

These frames can each comprise at least one opening for allowing the passage of a pipe that is provided for supplying hot air to a frost treatment system at the lip.

According to one embodiment, the front frame 22 comprises—at the inside wall—an edge 28 that is curved toward the rear of the nacelle against which are flattened one edge of a panel forming the lip 14 and one edge of another panel 30 forming the inside wall 16, whereby said edges are placed end to end. Advantageously, the panel 30 ensures an acoustic treatment and comprises an alveolar structure that imparts a certain rigidity to it.

In addition, at the outside wall 18, the front frame 22 comprises an edge 32 that is curved toward the rear of the nacelle against which at least a part of the panel forming the lip is flattened. According to one embodiment that is illustrated in FIG. 2, the outside wall 18 is formed by a panel 34 that is independent of the panel that forms the lip 14. In this case, the adjacent edges of the panel 34 and the panel forming the lip 14 are placed end to end and flattened against the curved edge 32. The panel that forms the lip 14 is generally metal in order to be compatible with a system for treating frost or ice using hot air that is provided at the air intake, and the panel 34 is made of composite material for reducing the on-board weight.

Relative to the rear frame, the latter ensures the absorption of flexural forces, rotational forces, etc., that impinge on the air intake, such as, for example, the weight of the air intake, the forces induced by the aerodynamic streams. This rear frame 26 is arranged in a plane that is essentially perpendicular to the longitudinal direction of the nacelle.

A rear frame is described in particular in the document FR-2,904,604.

According to this document, the rear frame—at its smallest diameter—comprises a flange against which the inside wall—attached to said flange by any suitable means—can rest. The rear frame is connected to the outside wall by means of a peripheral separating piece with a T-shaped cross-section, whereby said frame is connected at the foot of the T-shaped separating piece, and the head of the T serves as a support to the outside wall.

The outside wall of the nacelle extends from the air intake to the rear output. It consists of several juxtaposed elements, a lip 14 that is essentially rigid at the front, and then stationary panels 34 between the front frame and the rear frame, followed by moving elements such as cowls 36, also called doors.

The lip 14 and the stationary panels 34 are rigid because of the curved shapes and/or numerous reinforcements for withstanding forces generated by the aerodynamic flows or possible shocks.

The cowls are made to move to allow access to the power plant placed inside the nacelle. These cowls are articulated with the rest of the nacelle in different manners depending on the kinematics adopted and extend from the top of the nacelle, close to the anchoring of the mast, up to the bottom of the nacelle, and they have a semi-cylindrical shape.

In addition to the cowls, the nacelle is to comprise frames for accommodating the periphery of the cowls in closed position, means for positioning, locking, and maneuvering the cowls. All of these elements that are inherent to the moving elements tend to increase the on-board weight.

SUMMARY OF THE INVENTION

Also, this invention proposes an alternative that makes it possible to reduce the on-board weight.

For this purpose, the invention has as its object an aircraft nacelle that comprises, on the one hand, a lip whose surface that is in contact with the aerodynamic streams is extended inside the nacelle by an inside wall that delimits a pipe that empties at a power plant and outside of the nacelle by an outside wall, and, on the other hand, a first frame called a front frame that connects the inside wall and the outside wall, delimiting an annular pipe with the lip, and a second frame called a rear frame that connects the inside wall and the outside wall at the junction zone between the inside pipe and the pipe of the power plant, for a given cross-section of the nacelle along a plane that contains the longitudinal axis of the nacelle, a point A corresponding to the point of intersection between the rear frame and the inside wall, and a point B corresponding to the point of intersection between the rear frame and the outside wall, characterized in that the point B is offset toward the rear of the nacelle relative to the point A over more than 50% of the periphery of the rear frame.

BRIEF DESCRIPTION OF THE DRAWING FIGURES

Figure 3:
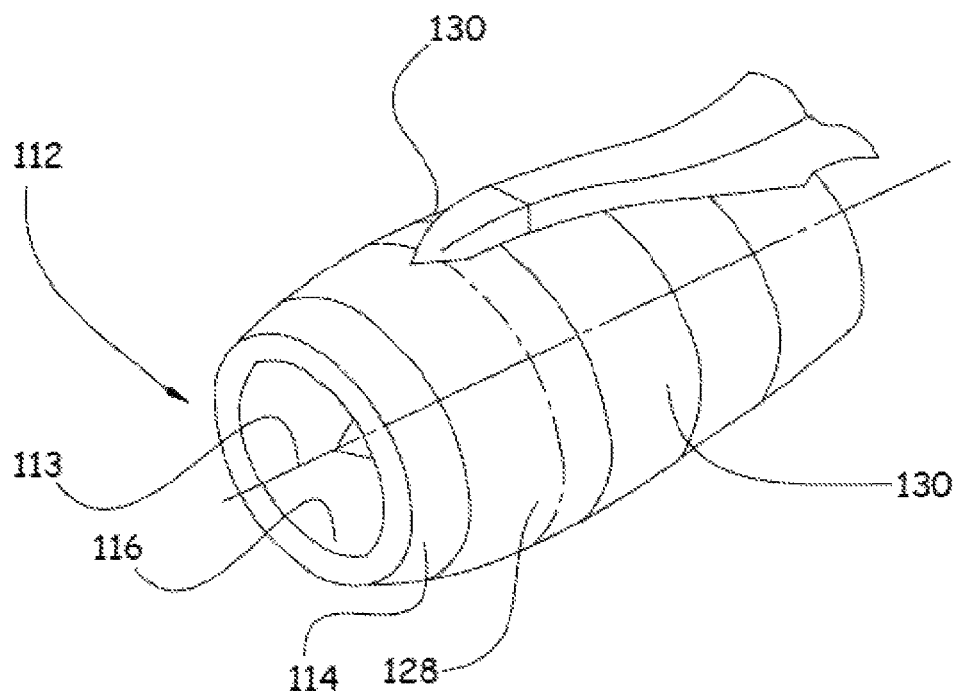
Figure 5:
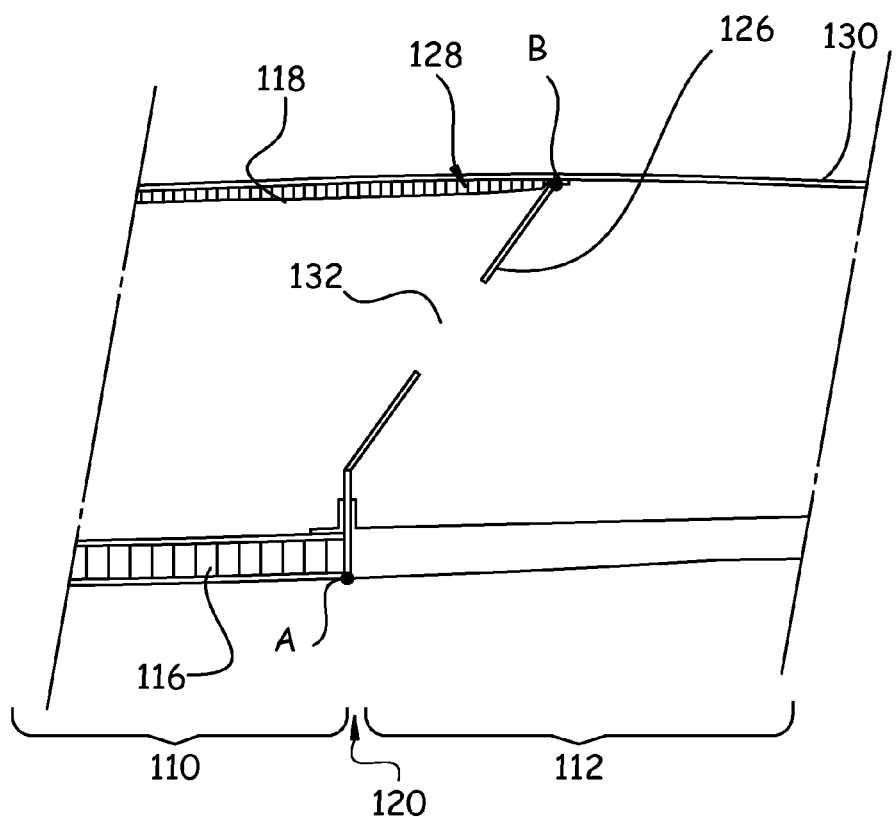
Figure 6:
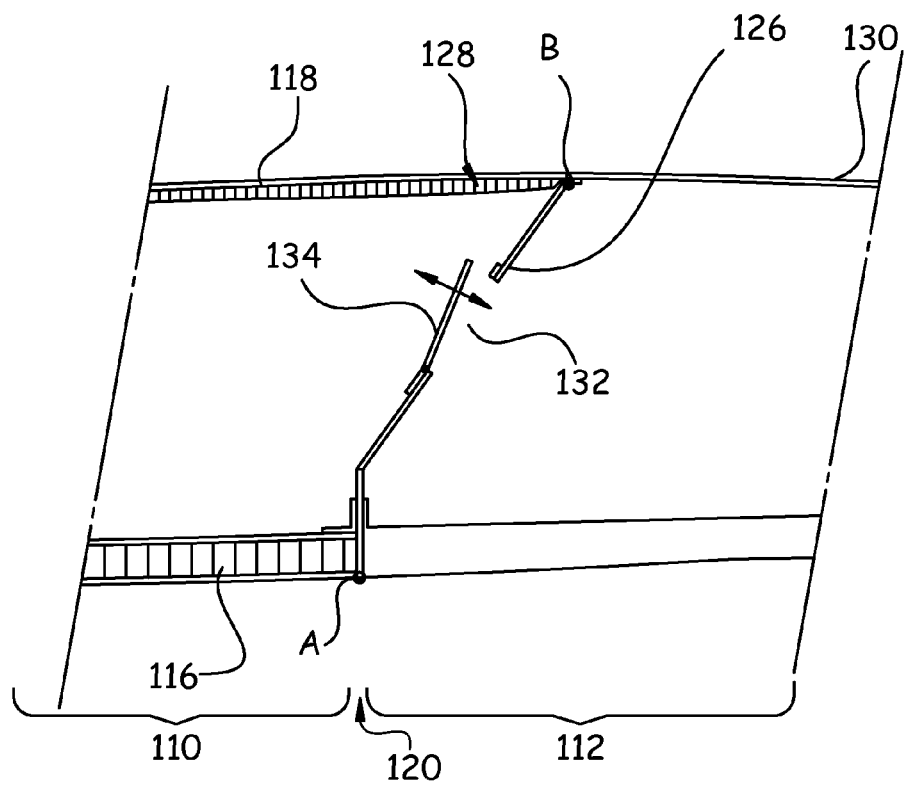
Figure 7A:
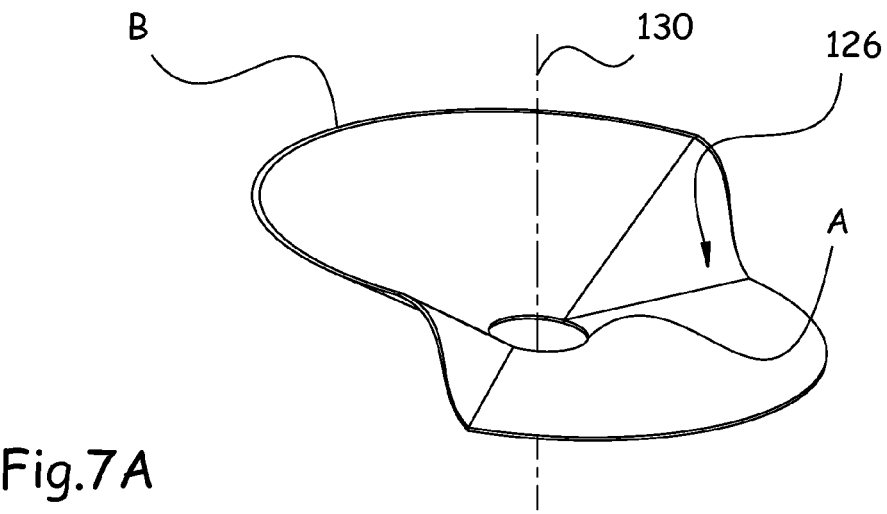
Figure 7B:
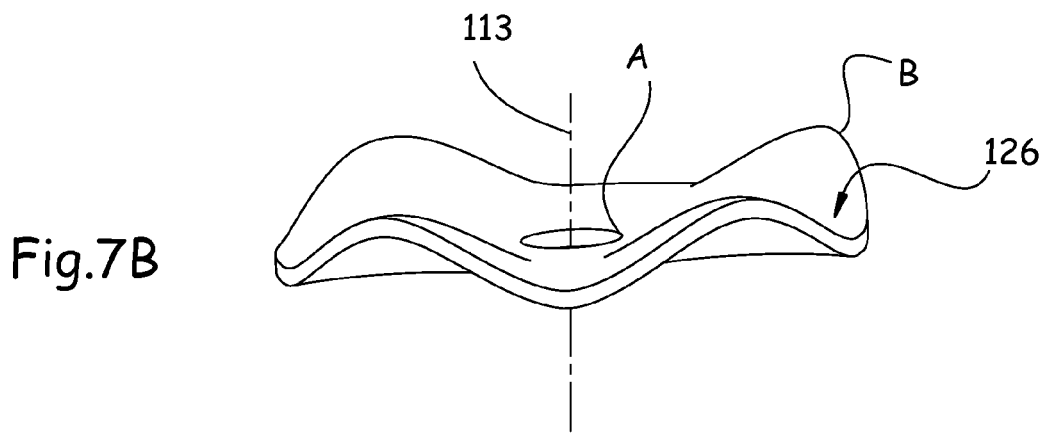
Figure 7C:
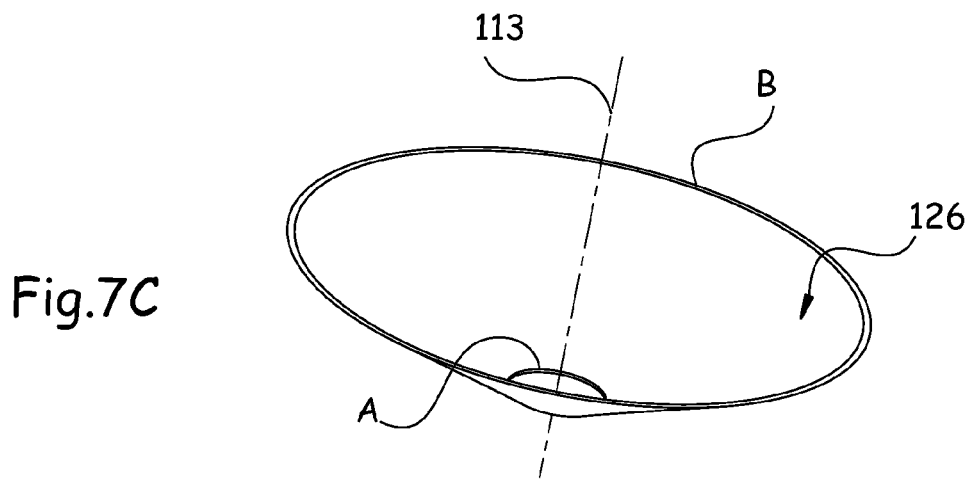

Other characteristics and advantages will emerge from the following description of the invention, a description that is provided only by way of example, relative to the accompanying drawings, in which:

FIG. 1 is a perspective view of an aircraft nacelle according to the prior art,

FIG. 2 is a cutaway along a longitudinal plane of the front of an aircraft nacelle according to the prior art, FIG. 3 is a perspective view of an aircraft nacelle according to the invention, FIG. 4 is a cutaway along a longitudinal plane of the front of an aircraft nacelle according to the invention, FIG. 5 is a cutaway that illustrates in detail a rear frame according to one variant of the invention, FIG. 6 is a cutaway that illustrates in detail a rear frame according to another variant of the invention, FIGS. 7A to 7C are diagrammatic representations of three variants of the rear frame according to the invention.

DETAILED DESCRIPTION OF THE INVENTION

FIGS. 3 and 4 show an aircraft nacelle that comprises—at the front—an air intake 110 that makes it possible to channel a stream of air in the direction of a power plant 112. Hereinafter, the longitudinal axis 113 of the nacelle corresponds to the axis of rotation of the power plant. The front of the nacelle corresponds to the location where the stream penetrates inside the nacelle, and the rear of the nacelle corresponds to the location where the stream exits from the nacelle.

The air intake 110 comprises a lip 114 whose surface that is in contact with the aerodynamic streams is extended inside the nacelle by an inside wall 116 that delimits a pipe and outside of the nacelle by an outside wall 118.

The inside wall 116 and the outside wall 118 of the air intake are connected at a junction zone 120 to the power plant 112.

On the structural plane, the air intake 110 comprises a first frame called a front frame 122 that connects the inside wall 116 and the outside wall 118, delimiting an annular pipe 124 with the lip 114, and a second frame called a rear frame 126 that connects the inside wall 116 and the outside wall 118 close to the junction zone 120.

The lip 114, the inside pipe 116, and the front frame 122 are not described in more detail because they are known to one skilled in the art.

The rear frame 126 ensures the absorption of flexural forces, rotational forces, etc., that impinge on the air intake, such as, for example, the weight of the air intake, the forces induced by the aerodynamic flows.

A rear frame is described in particular in the document FR-2,904,604.

It may comprise one or more concentric rings and/or one or more angular sectors.

It is connected by any suitable means to the inside pipe 116, in particular at the junction zone 120 between the inside pipe 116 and the pipe of the power plant 112.

The outside wall of the nacelle extends from the air intake to the rear exit. It consists of the juxtaposition of several elements, a lip 114 that is essentially rigid at the front, and then stationary panels 128 between the front frame 122 and the rear frame 126, followed by moving elements such as cowls 130 that are also called doors.

Advantageously, the stationary panels 128 are made of composite material and can comprise reinforcement elements. They are connected by connecting means to the rest of the nacelle at the front frame and the rear frame.

The cowls 130 are made to move for allowing access to the power plant 112, placed inside the nacelle. These cowls 130 are articulated to the rest of the nacelle in different manners depending on the kinematics adopted and extend from the top of the nacelle, close to the anchoring of the mast, to the bottom of the nacelle, and they have a semi-cylindrical shape.

The stationary panels 128 and the cowls 130 are not described in more detail because they can assume different configurations.

By virtue of geometric structure, for a given cross-section along a plane containing the longitudinal axis of the nacelle, the point A is called the point of intersection between the rear frame 126 and the inside wall 116, and the point B is called the point of intersection between the rear frame 126 and the outside wall 118. More specifically, the point A is arranged at the surface of the inside wall that is in contact with the aerodynamic streams and corresponds to the intersection of this surface with the direction of the rear frame close to the inside wall. In the same manner, the point B is arranged at the surface of the outside wall that is in contact with the aerodynamic streams and corresponds to the intersection of this surface with the direction of the rear frame close to the outside wall.

According to the invention, over more than 50% of the circumference of the rear frame, the point B is offset toward the rear of the nacelle relative to the point A. This configuration makes it possible to reduce the dimensions of the moving elements or cowls 130 and to increase the dimensions of the stationary panels 128, which tends to reduce the on-board weight.

Advantageously, the point B is offset toward the rear over the entire circumference of the rear frame, as illustrated in FIG. 7C. Thus, the outside periphery of the rear frame is offset toward the rear relative to the inside periphery.

According to another variant that is illustrated in FIG. 7A, the point B is offset toward the rear relative to the point A at an angular sector.

According to another variant that is illustrated in FIG. 7B, the point B is offset toward the rear relative to the point A at certain cross-sections. In this case, the rear frame can have a wavy profile along a circle with a center corresponding to the longitudinal axis 113 and inserted between the points A and B.

Preferably, the straight line AB forms an angle $\alpha$ that is between 20 and 45° relative to the straight line that passes through A perpendicular to the longitudinal axis 113, as illustrated in FIG. 4. This configuration makes it possible also to limit the deformations of the nacelle.

Advantageously, the connecting means of the stationary panel(s) 128 can be detached to allow access to the junction zone between the inside pipe 116 and the pipe of the power plant.

According to a preferred embodiment that is illustrated in FIG. 5, the rear frame 126 comprises at least one opening 132 that makes it possible to link the zones that are located on either side of the rear frame 126. Preferably, the rear frame 126 comprises several openings 132 that are distributed over the circumference.

These openings 132 make it possible to be able to access easily the junction zone between the power plant 112 and the inside pipe 116 and more particularly to be able to screw or unscrew the connecting elements ensuring the junction between these two elements.

In some cases, as illustrated in FIG. 6, each opening 132 comprises at least one door or one hatch 134 that is articulated relative to the edge of the opening, said door or hatch 134 being able to occupy a first state in which it blocks the opening 132 and another state in which it clears it. This arrangement makes it possible to be able to access easily the junction zone between the power plant 112 and the inside pipe 116, and more particularly to be able to screw or unscrew the connecting elements that ensure the junction between these two elements, while isolating the two zones that are separated by the rear frame 126 except during maintenance phases.

The invention claimed is:

1. An aircraft nacelle that comprises:
   a lip;
   an inside wall that delimits an inside pipe;

a surface of the lip that is in contact with aerodynamic streams extends inside the nacelle by the inside wall that delimits the inside pipe;

a junction zone that connects the inside pipe to a pipe of a power plant outside of the nacelle by an outside wall;

a front frame that connects the inside wall and the outside wall, delimiting an annular pipe with the lip;

a rear frame that connects the outside wall and the inside wall at the junction zone between the inside pipe and the pipe of the power plant, the rear frame comprising at least one opening to link zones that are located on either side of the rear frame, each opening comprising at least one door that is articulated relative to an edge of the opening, whereby said door is able to occupy a first state in which the door blocks the opening and another state in which the door clears the opening;

a point A corresponding to an intersection between the rear frame and the inside wall; and a point B corresponding to an intersection between the rear frame and the outside wall, wherein point A and point B lie in a plane that contains a longitudinal axis of the nacelle, wherein the point B is offset toward the rear of the nacelle relative to the point A over more than 50% of a periphery of the rear frame.

2. The aircraft nacelle according to claim 1, wherein the point B is offset toward the rear over the entire periphery of the rear frame.

3. The aircraft nacelle according to claim 1, wherein the straight line AB defined between point A and point B forms an angle of between 20 and 45° relative to a straight line that passes through A perpendicular to the longitudinal axis.

4. The aircraft nacelle according to claim 2, wherein a straight line AB defined between point A and point B forms an angle of between 20 and 45° relative to a straight line that passes through A perpendicular to the longitudinal axis.

5. The aircraft nacelle according to claim 1, wherein the point B is offset toward the rear relative to the point A at an angular sector of the rear frame.

6. The aircraft nacelle according to claim 1, wherein the rear frame has a wavy profile with the longitudinal axis being inserted between the point A and the point B.

7. The aircraft nacelle according to claim 1, wherein the at least one opening comprises a plurality of openings that are distributed over a circumference of the rear frame.

8. The aircraft nacelle according to claim 1, wherein the zones are isolated by the rear frame except during maintenance.

9. An aircraft nacelle that comprises:
a lip;
an inside wall that delimits an inside pipe;
a surface of the lip that is in contact with aerodynamic streams extends inside the nacelle by the inside wall that delimits the inside pipe;
a junction zone that connects the inside pipe to a pipe of a power plant outside of the nacelle by an outside wall;
a front frame that connects the inside wall and the outside wall, delimiting an annular pipe with the lip;
a rear frame that connects the outside wall and the inside wall at the junction zone between the inside pipe and the pipe of the power plant;
at least one opening to link zones that are located on either side of the rear frame, each opening comprising at least one door that is articulated relative to an edge of the opening, whereby said door is able to occupy a first state in which the door blocks the opening and another state in which the door clears the opening, and the zones are isolated by the rear frame except during maintenance;
a point A corresponding to an intersection between the rear frame and the inside wall; and
a point B corresponding to an intersection between the rear frame and the outside wall, wherein point A and point B line a plane that contains longitudinal axis of the nacelle, wherein the point B is offset toward the rear of the nacelle relative to the point A over more than 50% of a periphery of the rear frame.

10. The aircraft nacelle according to claim 9, wherein the point B is offset toward the rear over the entire periphery of the rear frame.

11. The aircraft nacelle according to claim 9, wherein a straight line AB defined between point A and point B forms an angle of between 20 and 45° relative to a straight line that passes through point A perpendicular to the longitudinal axis.

* * * * *